under 35 U.S.C. 154(b) by 222 days.

United States Patent
Braun et al.

(10) Patent No.: US 9,421,701 B2
(45) Date of Patent: Aug. 23, 2016

(54) BLOW MOULDING MACHINE WITH A CLEAN ROOM AND A DRYING UNIT FOR SUPPLYING AIR

(71) Applicant: KRONES AG, Neutraubling (DE)

(72) Inventors: Franz Braun, Regensburg (DE); Juergen Soellner, Beratzhausen (DE); Holger Mueller, Pentling (DE)

(73) Assignee: KRONES AG, Neutraubling (DE)

( * ) Notice: Subject to any disclaimer, the term of this patent is extended or adjusted under 35 U.S.C. 154(b) by 222 days.

(21) Appl. No.: 14/058,736

(22) Filed: Oct. 21, 2013

(65) Prior Publication Data
US 2014/0110876 A1    Apr. 24, 2014

(30) Foreign Application Priority Data

Oct. 22, 2012  (DE) .................. 10 2012 110 072

(51) Int. Cl.
| | | |
|---|---|---|
| B29C 49/46 | (2006.01) | |
| B29C 49/64 | (2006.01) | |
| B29C 37/00 | (2006.01) | |
| B29C 49/12 | (2006.01) | |
| B29C 49/06 | (2006.01) | |

(52) U.S. Cl.
CPC ........... B29C 37/0092 (2013.01); B29C 49/46 (2013.01); B29C 49/64 (2013.01); B29C 49/06 (2013.01); B29C 49/12 (2013.01); B29C 2049/4676 (2013.01); B29C 2049/4697 (2013.01)

(58) Field of Classification Search
CPC .............. B29C 2049/4676; B29C 2049/4697; B29C 49/46; B29C 2049/4833; B29C 2049/4828; B29C 2049/4823; B29C 2049/4284
See application file for complete search history.

(56) References Cited

U.S. PATENT DOCUMENTS

| 3,930,779 A | * | 1/1976 | Farrell | ................ B29C 49/4823 |
| | | | | 425/526 |
| 3,937,609 A | * | 2/1976 | Ryder | ................. B29C 45/1701 |
| | | | | 425/210 |
| 2009/0065980 A1 | * | 3/2009 | Baumgarte | ............. B29C 49/56 |
| | | | | 264/503 |
| 2009/0081326 A1 | | 3/2009 | Adriansens et al. | |
| 2011/0133369 A1 | * | 6/2011 | Martini | .................. B29C 49/36 |
| | | | | 264/523 |
| 2011/0286899 A1 | * | 11/2011 | Martini | ............. B01D 46/0012 |
| | | | | 423/210 |
| 2011/0311675 A1 | * | 12/2011 | Voth | ........................ B29C 49/42 |
| | | | | 425/526 |
| 2012/0070522 A1 | | 3/2012 | Voth et al. | |

FOREIGN PATENT DOCUMENTS

| DE | 69626605 | | 11/2003 | | |
| DE | 202011109959 | | 7/2012 | | |
| EP | 2578504 | | 4/2013 | | |
| GB | 1418345 A | * | 12/1975 | ............ | B01D 53/265 |
| GB | 2308066 A | * | 6/1997 | ............. | A61L 2/208 |

* cited by examiner

*Primary Examiner* — Robert B Davis
(74) *Attorney, Agent, or Firm* — Greer, Burns & Crain, Ltd.

(57) ABSTRACT

An apparatus is provided for molding plastic preforms into plastic containers, including a transport unit, on which a plurality of molding stations is provided and which moves the molding stations along a predefined transport path, wherein the molding stations respectively have blow mold parts that are movable relative to each other, the parts are movable relative to each other for opening and closing blow molds; and including a clean room that surrounds a transport path, along which the molding stations are transported, and which is separated from an environment by at least one wall; wherein the apparatus includes a cooling system for cooling at least one element of the respective molding stations; and wherein the apparatus includes a supply unit that supplies a gaseous medium to the clean room. The apparatus also includes a drying unit for drying the gaseous medium supplied to the clean room via the supply unit.

7 Claims, 1 Drawing Sheet

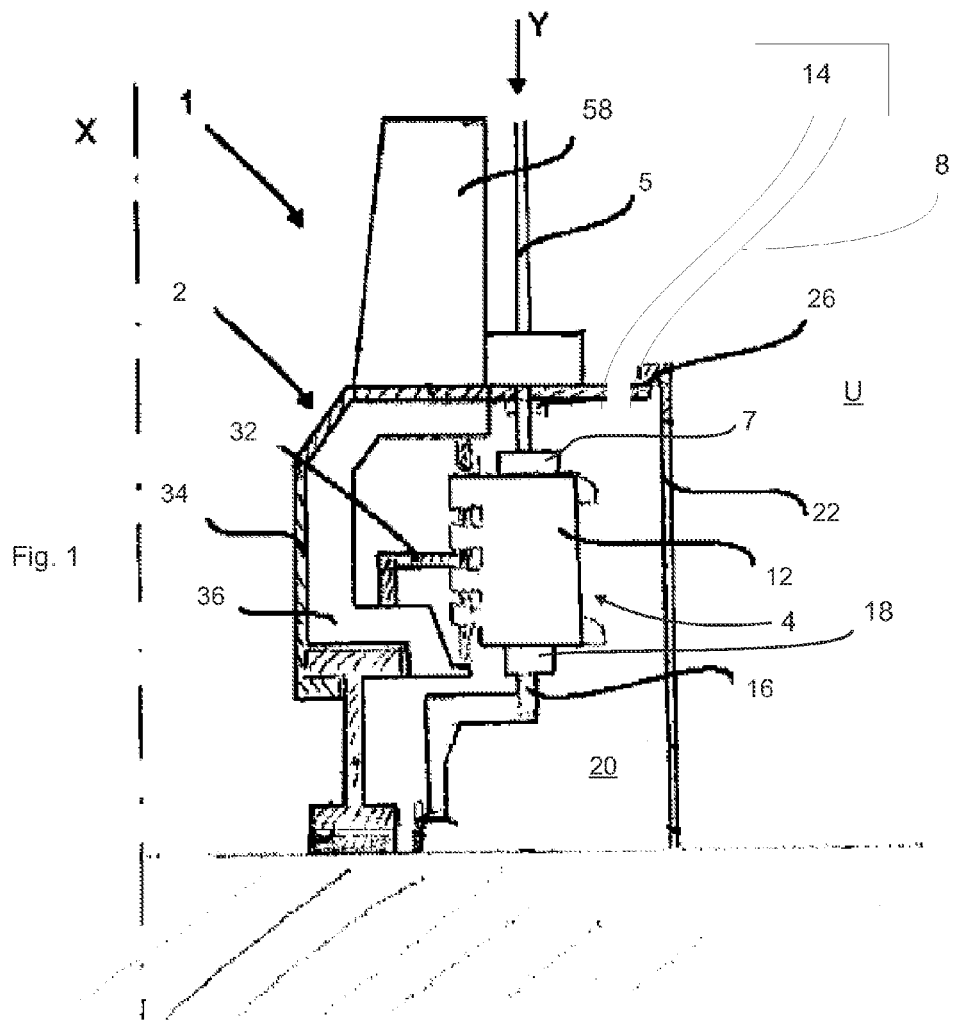
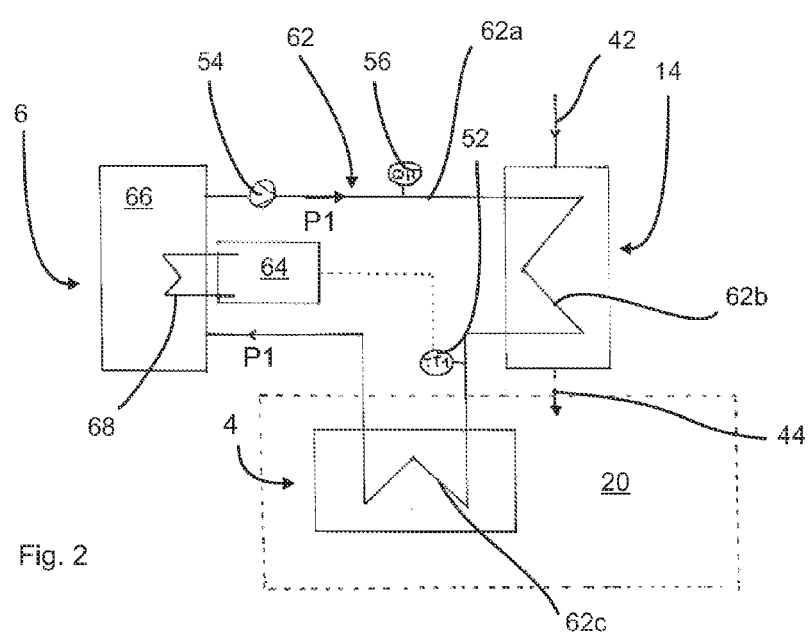

BLOW MOULDING MACHINE WITH A CLEAN ROOM AND A DRYING UNIT FOR SUPPLYING AIR

BACKGROUND

The present invention relates to an apparatus and a method for moulding plastic preforms into plastic containers. Such apparatuses and methods have been known from the prior art for a long time.

The process of bottling certain beverages is one that has to be carried out in a sterile manner. In recent times, however, blow moulding machines have become known which also allow a blow moulding process to be carried out under sterile conditions. These machines thereby usually have a clean room, within which the moulding of the plastic preforms takes place.

In order to provide a clean room atmosphere in such a clean room or respectively isolator, ambient air is usually filtered, for example by means of depth filters. This can thereby be carried out either centrally via a filtration unit for an entire clean room, or in a decentralised manner via individual filter units in the respective areas of the isolator or respectively clean room. In further methods it is additionally necessary for the individual moulding stations or respectively at least the blow moulds thereof to be cooled to temperatures of approximately 10° within the blow modules. In such cases it may occur that humid air condenses on these mould carriers. This can lead to a microbiologically high risk.

SUMMARY

The present invention is therefore based on the object of designing such blow moulding machines so as to be safer to operate. In particular, the risks to be avoided are those which result from condensation of the air within the sterile room.

An apparatus according to the invention for moulding plastic preforms into plastic containers comprises a transport unit, on which a plurality of moulding stations is provided and which moves these moulding stations along a predefined transport path. These moulding stations respectively include blow mould parts that can be moved relative to each other for opening and closing blow moulds. Further, the apparatus includes a clean room which surrounds the transport path, along which the moulding stations are transported and which is separated from an (unsterile) environment by at least a wall. Further, the apparatus includes a cooling system for cooling at least one element of the respective moulding stations, and the apparatus further includes a supply unit that supplies a gaseous medium to the clean room.

According to the invention, the apparatus includes a drying unit in order to dry the gaseous medium supplied to the clean room via the supply unit.

It is therefore proposed that the medium that forms the clean room atmosphere is initially dried by means of a drying unit. In this way, any condensation on the relatively cool blow mould parts can be avoided. In particular, the cooling system is used for cooling the blow moulds and in particular those areas which come into contact with the plastic preforms to be expanded during the moulding process.

The gaseous medium supplied to the clean room is here preferably not the medium that is supplied for expanding the plastic preforms, but this medium is supplied to the clean room itself.

In a further advantageous embodiment, the transport unit is a rotatable transport unit and in particular a rotatable carrier on which the individual moulding stations are—in particular equidistantly—arranged.

Advantageously, at least one moulding station and particularly preferably all of the moulding stations also respectively include stretch rods which stretch the plastic preforms in their longitudinal direction. Further, blow nozzles are preferably respectively provided on the moulding stations, which apply a gaseous medium and in particular pressurised air onto the plastic preforms, in order to expand the latter.

In a further advantageous embodiment, a filter unit is also provided, which filters the gaseous medium supplied to the clean room via the supply unit.

Advantageously, the supply of the gaseous medium into the clean room is designed in such a way that the gaseous medium is supplied to the clean room from an (unsterile) environment.

In a further advantageous embodiment, the cooling unit includes at least one conduit for conducting a flowable and in particular liquid cooling medium that is supplied to the blow mould parts for the cooling thereof. It is therefore proposed here that the cooling of the blow mould parts and in particular of the blow moulds is carried out by means of a coolant. To this end, the blow mould parts may include for example passages, through which the flowable and in particular liquid cooling medium can be conducted. Thus, such passages may be provided for example in the blow moulds or in the support trays thereof.

In a further advantageous embodiment, this conduit is, at least in sections, also a component of the drying unit.

Systems for drying air are known from other areas. Here, however, it should be ensured that the possibility of condensation is avoided at any time during the process. Thus, although it would be conceivable to use systems that operate independently from each other, for example one cooling circuit for drying the air and a further cooling circuit for cooling the blow moulds or respectively mould carriers, however, this would require an increased control complexity as well as the costly provision of several cooling units. Also, the level of complexity and therefore also the degree of susceptibility to errors would be increased.

It is therefore proposed in this embodiment that the cooling unit effects both the cooling of the blow moulds and the drying of the air supplied to the clean room.

In other words, said cooling medium is in particular also used for drying the air supplied to the clean room.

Advantageously, the drying units and the cooling units for cooling the moulding station elements are integrated into a common cooling circuit. Advantageously, this cooling circuit includes a pump unit.

In a further advantageous embodiment, the above-mentioned conduit extends in such a way that the cooling medium extends from a cooling unit for cooling the cooling medium first to the drying unit and subsequently to the elements of the moulding station. Advantageously, a coolant, such as for example glycol, is initially guided in series via the air dryer and subsequently via the mould carrier cooling unit or respectively the blow moulds. Advantageously, the volume flow of the coolant is here kept constant. Preferably, a compressor for providing the cooling power maintains a desired temperature value at the input of the cooling stage for the mould carriers or respectively the blow moulds. In this area, the respective temperature for an optimum container moulding process should be substantially constant.

Advantageously, a pump unit of the cooling circuit ensures a constant volume flow.

In a further advantageous embodiment, the apparatus includes a measuring unit for determining at least one physical property that is characteristic of the flowable medium.

Advantageously, the measuring unit thereby detects a proportion of a cooling substance in the flowable medium.

It is proposed here to provide a measuring unit in a cooling circuit, which determines the concentration of the cooling substance, which is in particular a glycol. Preferably, this measuring unit measures a ratio between glycol and a solvent, such as in particular water.

At a concentration of in particular less than 30% by volume of glycol in water, the microbiological inherent stability is no longer present and thus the sterility of the system is no longer ensured. It is to be ensured here that the mould carriers with their cooling circuits are located within the clean room. It is pointed out that the measurement of this glycol proportion as described here can also be used independently from the above-described drying unit.

The applicant reserves the right to claim protection also for a blow moulding machine, which is characterised precisely by this sensor unit in the cooling circuit and which can, if necessary, also operate without the above-mentioned drying unit.

In a further advantageous embodiment, the apparatus includes a second measuring unit that detects a temperature of the flowable medium, in particular of the cooling medium. Advantageously, a control unit is further provided which controls a cooling unit on the basis of this measured temperature, in order to keep in this way, as mentioned above, the input temperature of the cooling medium as constant as possible.

The present invention is further directed to a method for moulding plastic containers, wherein the plastic containers are transported in a plurality of moulding stations provided on a transport unit and are moulded, during this transport operation, into plastic preforms by applying a gaseous medium thereto, and wherein the moulding stations are transported within a clean room and at least one element of the individual moulding stations is cooled by means of a cooling system.

According to the invention, dried air is supplied to the clean room by a drying unit.

This supplied air is also not the air supplied to the plastic preforms for the expansion thereof either, but air that is supplied to the atmosphere of the clean room. Advantageously, as mentioned above, also blow air is additionally supplied to the individual plastic preforms for the expansion thereof. This air, too, may be sterile air.

Advantageously, a flowable medium is used both for cooling the elements of the moulding stations and for drying the gaseous medium supplied to the clean room, this flowable medium successively flowing through the drying unit and through at least an area of the moulding stations one after the other. On the method side, it is therefore also proposed that the same medium that is used for cooling the blow moulds is also used for drying the air supplied to the clean room.

In a further preferred method, at least one physical and/or chemical property of the flowable medium is determined. Advantageously, this is a concentration of the component of this cooling medium, in particular a glycol proportion.

Preferably, the cooling medium is carried at a constant volume flow. In a further advantageous method, at least two physical properties of the flowable medium are determined and in particular a temperature of the flowable medium as well as the above-mentioned concentration of the component of this cooling medium are determined. Advantageously, a cooling unit is controlled on the basis of the determined temperature. In a further advantageous method, the flowable medium is first used for drying the air and subsequently for cooling the individual blow moulds.

By connecting the two heat exchangers in series and preferably controlling on the basis of just one temperature measuring unit, a temperature differential between the drying unit and the cooling of the blow mould parts is ensured at all times. Thus, the drying unit is in any case passed colder than the mould carriers or respectively blow moulds (because the heat in the drying unit is transferred to the glycol). Thus, due to the lower temperature, more water precipitates because the saturation limit of the air drops with water. In this way, the temperature of the air will be lower after the drying unit than the temperature of the mould carriers or respectively of the blow mould cooling.

If in the isolator the air thus dried contacts the mould carriers that are at a higher temperature, there is no risk of condensation. In this way, the system remains dry and thus microbiologically stable. As a result of the above-mentioned series connection, this is also independent from the actual temperature of the cooling medium.

The system described here can operate with an already present cooling unit for cooling mould carriers, which is in particular already available as standard. Therefore, there is no additional effort required; all that is needed is a coupling with the drying unit. This also allows modularity.

As a result of the measurement of the concentration of the glycol as described above, the sterility of the process can also be ensured. If the concentration falls below a minimum level, a warning can preferably be generated in order to cause the coolant to be replaced.

BRIEF DESCRIPTION OF THE DRAWINGS

Further advantages and embodiments will become evident from the attached drawings, wherein:

FIG. 1 shows a schematic view for illustrating an apparatus according to the invention; and FIG. 2 shows a schematic block diagram for illustrating the method according to the invention.

DETAILED DESCRIPTION

FIG. 1 shows a schematic view of an apparatus 1 according to the invention for moulding plastic preforms into plastic containers. Reference numeral 2 identifies here in a very schematic form a transport unit such as a blow wheel, on which the individual moulding stations 4 are provided. Reference numeral 12 identifies a blow mould part such as a blow mould carrier, which can here be pivoted in the level of the figure, in order to open and close the blow moulds. A stretch rod 5, which is held on a carrier 58, can be used to stretch the plastic preform (within the moulding station 4) in a longitudinal direction. Apart from that, also a blow nozzle 7 is provided in order to apply a gaseous medium and in particular pressurised air onto the plastic preform.

Reference numeral 20 identifies a clean room, within which the moulding station (and also one or more further moulding stations that are not shown) is guided. Reference numeral 16 identifies a drive unit, by means of which here a bottom part 18, which also forms a component of the blow mould, can be moved. Reference numeral 22 identifies a wall that separates the clean room 20 from an environment U. This clean room contains a clean room atmosphere, in particular from sterile air.

Reference numeral 34 identifies a further wall delimiting the clean room, and this wall is here formed by the carrier or respectively the transport unit itself. The moulding station 12 is provided on a mounting 36, and the blow mould parts can be pivoted by means of a movement unit 32.

Reference numeral 8 identifies a supply unit, in order to supply a gaseous medium to the clean room 20. To this end, a drying unit 14 is provided which is used for drying this gaseous medium. Reference numeral 26 identifies in a very schematic manner a sealing unit in order to separate a movable wall 34, which delimits the clean room, from the stationary wall 22. Preferably, a so-called surge chamber is used, which has a recirculating passage as well as a blade that is submerged into this passage. This passage contains for example a liquid such as water.

FIG. 2 shows a schematic diagram for illustrating the method according to the invention. Here again, the clean room 20 is shown, within which the individual moulding stations 4 are transported. Reference numeral 6 identifies in its entirety a cooling system that is used for cooling elements of the moulding station 4. This cooling system 6 thereby includes a cooling unit 66 as well as a compressor 64, in order to cool altogether a cooling medium contained in a conduit 62.

This conduit 62 thereby has a plurality of conduit sections 62a, 62b and 62c. As can be seen, the cooling medium flows in the conduit 62 (arrow P1) initially through the drying unit 14, in which it causes the air supplied to the clean room 20 to be dried. In this context, air from the environment, that has preferably already been filtered, is supplied to the drying unit 14 via a conduit 42, and the dried air is supplied to the clean room 20 via a further discharge conduit 44. Reference sign 62a thus identifies a first conduit section of the conduit 62, which is located upstream of the drying unit 14. Reference sign 62b identifies that section which provides for the drying of the air within the drying unit. Subsequently, the cooling medium arrives at a third section 62c, in which it is used for cooling the individual moulding stations 4. Subsequently, the cooling medium is returned back into the cooling unit 66. According to the invention, it is therefore preferred to provide a common cooling circuit for drying the air to be supplied to the clean room 20, as well as for cooling the moulding stations 4 or respectively the blow moulds contained therein.

Reference numeral 54 identifies a pump unit that pumps the cooling medium through the cooling circuit. Reference numeral 52 identifies a temperature measuring unit that measures a temperature for the cooling needed after the drying unit 14 or respectively ensures a required temperature of the cooling medium for cooling the blow moulds. The compressor and thus the cooling effect are controlled as a function of this temperature. The cooling medium is here not only supplied to a moulding station 4, but preferably to all moulding stations. This in turn can be carried out by manifold pipework that distributes the cooling medium (not shown) to the individual moulding stations.

Reference numeral 56 identifies a further measuring unit that determines here a concentration of a coolant (for example glycol). Apart from that, a control unit 70 may be provided (not shown), which controls the entire cooling process for example as a function of the measurement values from the measurement units 52 and 56.

The applicant reserves the right to claim all of the features disclosed in the application documents as being essential to the invention, as far as they are novel over the prior art either individually or in combination.

The invention claimed is:

1. An apparatus for moulding plastic preforms into plastic containers, comprising:
    a transport unit including a plurality of moulding stations that is configured to move the moulding stations along a predefined transport path, the moulding stations respectively having blow mould parts that are movable relative to each other for opening and closing the blow moulds;
    a clean room that surrounds the transport path, along which said moulding stations are transported, and which is separated from an environment by at least one wall;
    a supply unit configured for supplying a gaseous medium to the clean room;
    a drying unit configured for drying the gaseous medium supplied to the clean room via the supply unit; and
    a cooling system associated with said drying unit and said moulding stations, said cooling system configured for cooling at least one element of the respective moulding stations.

2. The apparatus as claimed in claim 1, wherein the cooling system includes a cooling unit having at least one conduit for conducting a flowable cooling medium, which is supplied to the blow mould elements for the cooling thereof.

3. The apparatus as claimed in claim 2, wherein the conduit forms, at least in sections, also a component of the drying unit.

4. The apparatus as claimed in claim 3, wherein the conduit extends in such a way that proceeding from a cooling unit for cooling the cooling medium, the cooling medium arrives initially at the drying unit and subsequently at the elements of the moulding stations.

5. The apparatus as claimed in claim 4, wherein the apparatus includes a measurement unit for determining at least one of the physical properties that are characteristic of the flowable medium.

6. The apparatus as claimed in claim 5, wherein the measurement unit detects a proportion of a cooling substance in the flowable medium.

7. The apparatus as claimed in claim 6, wherein the apparatus includes a second measurement unit for detecting a temperature of the flowable medium.

* * * * *